Figure 3:
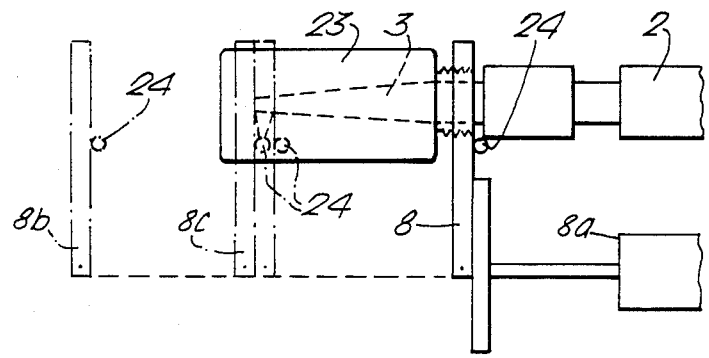

United States Patent [19]

Hart

[11] Patent Number: 4,518,549

[45] Date of Patent: May 21, 1985

[54] APPARATUS FOR AND METHOD OF COOLING THE CORE RODS OF AN INJECTION BLOW MOULDING MACHINE

[75] Inventor: Reginald J. Hart, Chapel-En-Le-Frith, England

[73] Assignee: Roymere Limited, England

[21] Appl. No.: 547,793

[22] Filed: Nov. 2, 1983

[30] Foreign Application Priority Data

Feb. 4, 1983 [GB] United Kingdom ............... 8303056
Sep. 13, 1983 [GB] United Kingdom ............... 8324500

[51] Int. Cl.³ ............................................. B29C 17/07
[52] U.S. Cl. ..................................... 264/39; 264/537; 264/538; 425/526; 425/533; 425/537; 425/547
[58] Field of Search .......................... 264/39, 537, 538; 425/526, 533, 547, 537

[56] References Cited

U.S. PATENT DOCUMENTS

| | | | |
|---|---|---|---|
| 3,186,028 | 6/1965 | Dobbins et al. ............... | 264/538 X |
| 3,349,155 | 10/1967 | Valyi ................................. | 264/537 |
| 3,707,591 | 12/1972 | Chalfant ......................... | 264/538 X |
| 3,884,609 | 5/1975 | Britten ........................... | 425/533 X |
| 4,018,860 | 4/1977 | Farrell ............................ | 264/538 X |

FOREIGN PATENT DOCUMENTS 55-69432  5/1980  Japan ..................... 264/39

Primary Examiner—Jan Silbaugh
Attorney, Agent, or Firm—Charles W. Helzer

[57] ABSTRACT

The invention provides a method of and apparatus for cooling the core rods of an injection blow moulding machine having stripper means and an injection blow moulding machine incorporating the cooling apparatus of the invention. The apparatus of the invention comprises nozzle means, preferably in the form of a hollow nozzle bar the interior of which is connectable to a source of cooling fluid under pressure, separate from the stripper means and comprising a plurality of nozzles which are movable between an out-of-use position and an in-use position in which they are interposed between the core rods and stripper means for directing cooling fluid onto the tips of the core rods and preferably substantially axially of the core rods.

17 Claims, 6 Drawing Figures

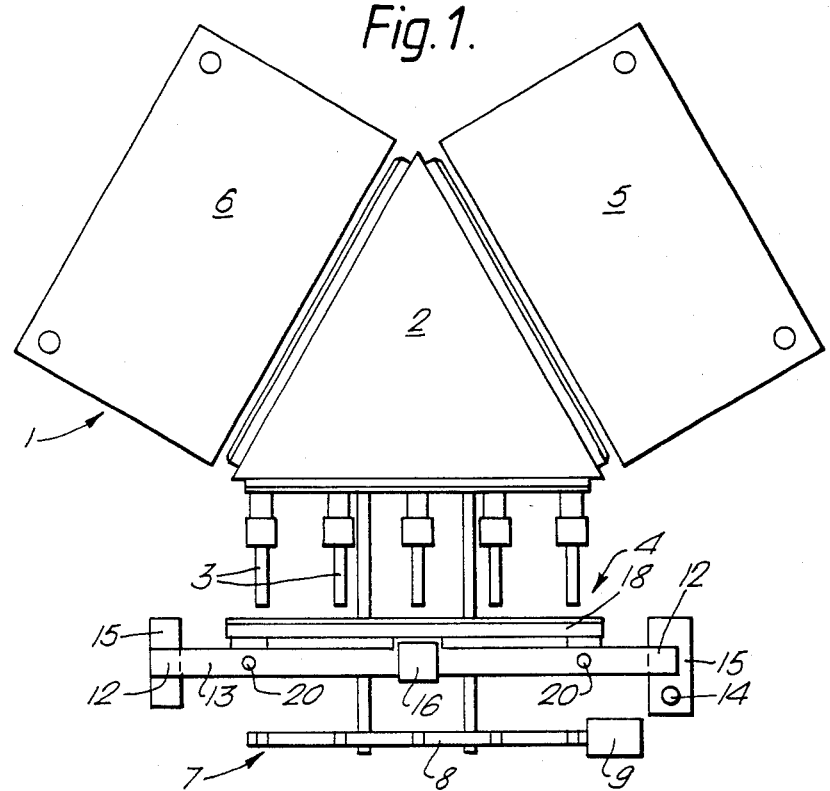
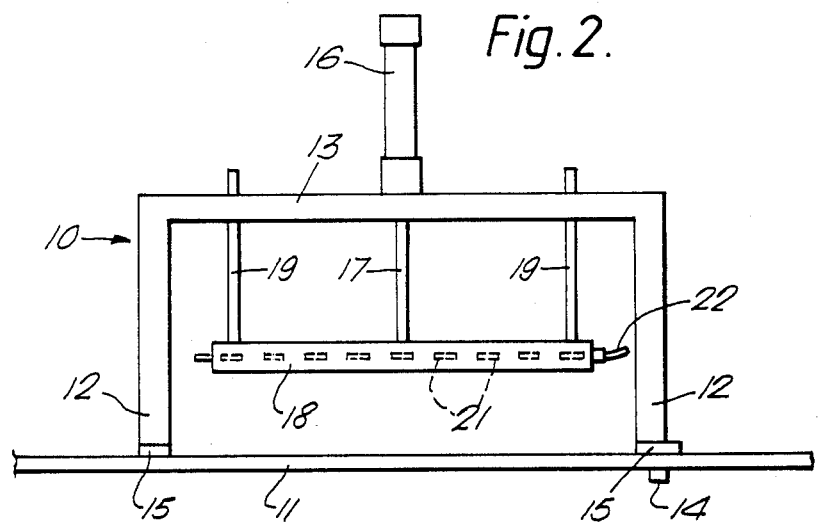

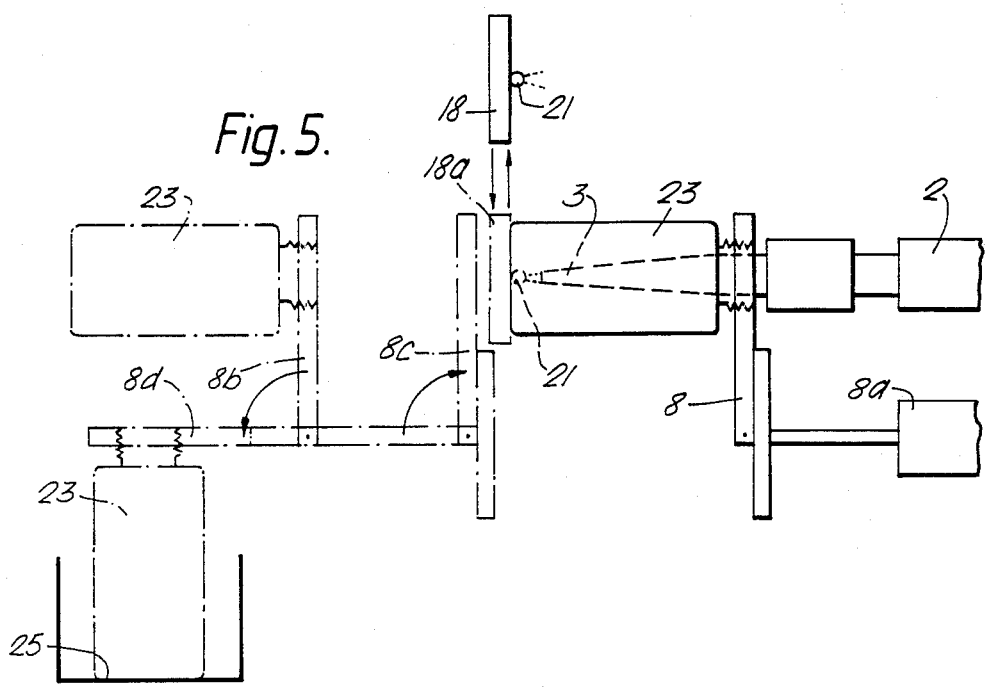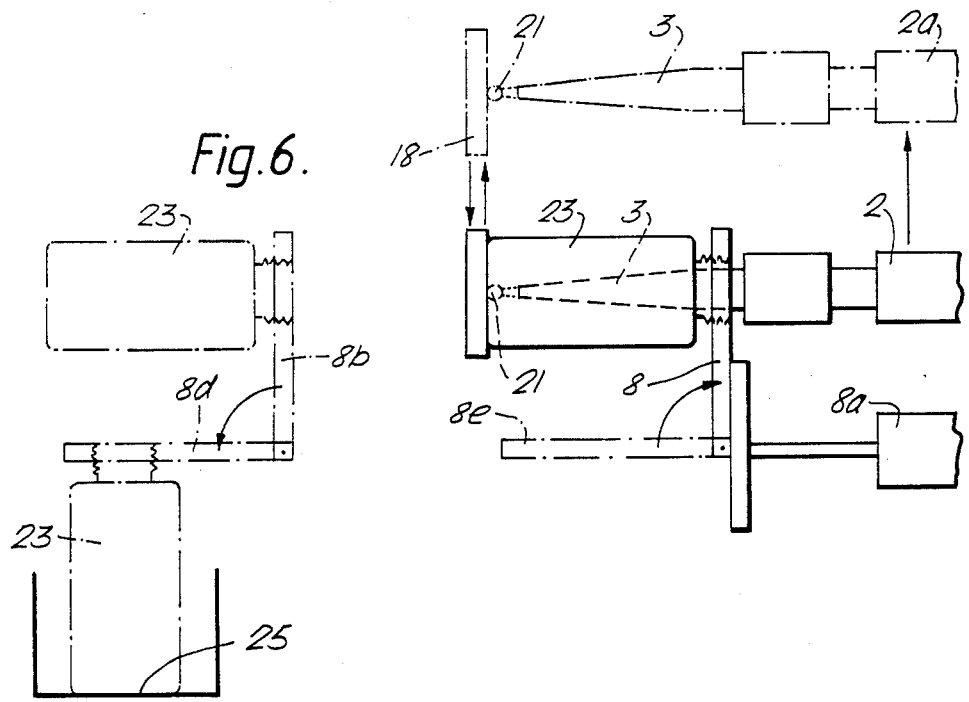

APPARATUS FOR AND METHOD OF COOLING THE CORE RODS OF AN INJECTION BLOW MOULDING MACHINE

The present invention relates to apparatus for and a method of cooling the core rods of an injection blow moulding machine.

Injection blow moulding machines of the horizontal rotary indexing kind generally comprise a rotary head which carries a plurality of core rods and which can be indexed to transport the core rods to successive work stations such as an injection mould station where a measured quantity of plastics material is injected around each core rod to produce a pre-form, a blow moulding station where the pre-forms are blow moulded to form articles and a stripping station where the blow moulded articles are removed from the core rods. An additional station is sometimes provided, e.g., for pre-conditioning the core rods, for providing a second injection mould stage, for providing a second blow mould stage or for flaming blow moulded articles before they are removed from the core rods. Stripper means is provided at the stripping station, the stripper means being movable between a retracted position in which blow moulded articles on the core rods can be engaged by the stripper means by relative movement between the rotary head and the stripper means and an advanced position in which the blow moulded articles are removed from the core rods. In some cases the stripper means is rotatable through 90° when in advanced position to automatically deposit the stripped articles onto a conveyor or the like. Once the blow moulded articles have been removed from the core rods it is usually necessary to cool the core rods before commencing a new cycle and this cooling is usually effected by means of nozzles mounted on the stripper means which direct a cooling fluid, e.g. air, onto the tips of the core rods to cool them. Generally, the cooling fluid is directed onto the tips of the core rods at an angle to the axes of the core rods so as to impinge on a side surface thereof. This known cooling arrangement suffers from the disadvantage that because the cooling fluid is directed onto a side surface at the tip of each core rod uneven cooling of the core rod takes place. Moreover, the total cycle time of injection blow moulding machines of the kind described is to an extent controlled by the time needed to cool the tips of the core rods. Where the stripper means is of the kind adapted to rotate through 90° to deposit articles upright on a conveyor there is the further disadvantage that during this rotational movement, which needs to be slow and deliberate, the cooling jet nozzles are taken away from the core rods so that little or no cooling of the core rods takes place during this time.

The present invention has as its object to provide apparatus for and a method of cooling the core rods of an injection blow moulding machine which overcomes or mitigates the aforesaid disadvantages and which enables faster cycle times to be achieved.

The present invention provides apparatus for cooling the core rods of an injection blow moulding machine having a stripping station at which blow moulded articles are removed from the core rods by stripper means movable between a retracted position in which blow moulded articles on the core rods can be engaged by the stripper means and an advanced position in which the blow moulded articles are removed from the core rods, the apparatus comprising nozzle means for directing cooling fluid onto the tips of the core rods, means for moving said nozzle means between an out-of-use position and an in-use position in which the nozzle means is adapted to direct cooling fluid onto the core rods, and means for supplying cooling fluid to said nozzle means when the nozzle means is in in-use position.

The present invention also provides a method of cooling the core rods of an injection blow moulding machine having a stripping station at which blow moulded articles are removed from the core rods by stripper means movable between a retracted position in which blow moulded articles on the core rods can be engaged by the stripping means and an advanced position in which the blow moulded articles are removed from the core rods, the method comprising the steps of engaging the blow moulded articles with the stripper means, removing the blow moulded articles from said core rods by moving the stripper means to said advanced position, interposing nozzle means between the core rods and the stripper means, directing a cooling fluid onto the tips of the core rods using said nozzle means, and moving the nozzle means to an out-of-use position on completion of cooling.

The invention further provides an injection blow moulding machine when provided with apparatus for cooling the core rods according to the present invention.

According to one embodiment of the present invention the stripper means comprises a stripper bar which is rotatable through 90° from an upright position to a lowered position to deposit moulded articles stripped from the core rods onto a conveyor or other horizontal surface and the arrangement is such that the said nozzle means is moved to its in-use position and cooling of the core rods commenced at about the same time as the stripper bar is rotated to its lowered position to deposit the moulded articles, the stripper bar is retractable to an intermediate position to disengage it from the deposited moulded articles, the stripper bar is rotated back through 90° to its upright position and remains at said intermediate position until the cooling of the core rods is completed when the nozzle means is returned to its out-of-use position and the stripper means is returned to its retracted position.

According to a further embodiment of the present invention the stripper means comprises a stripper bar which is rotatable through 90° from an upright position to a lowered position to deposit moulded articles stripped from the core rods onto a conveyor or other horizontal surface and the arrangement is such that the said nozzle means is moved to its in-use position and cooling of the core rods commenced at about the same time as the stripper bar is rotated to its lowered position to deposit the moulded articles, the stripper bar is retracted to disengage it from the deposited moulded articles and, while still in its lowered position, is returned to its retracted position, cooling of the core rods is completed, the nozzle means is returned to its out-of-use position and the stripper bar is rotated through 90° to its upright position.

The nozzle means preferably comprises a plurality of nozzles which correspond in number to the number of core rods to be cooled. Preferably, the arrangement is such that when the nozzle means is in in-use position each of said nozzles will be aligned with a core rod so as to direct cooling fluid, such as air, onto the tip of the core rod substantially axially of the core rod, it having been found that directing the cooling fluid substantially axially of the core rods promotes more even cooling of the core rods.

The nozzle means may comprise a hollow nozzle bar having spaced apertures along the length thereof which provide or in which are mounted said nozzles, the interior of the nozzle bar being connected or connectable to a source of cooling fluid under pressure.

The apparatus of the present invention may further comprise a frame which is mountable on the worktable of an injection blow moulding machine at the stripping station so as to straddle the stripper means and comprising a pair of spaced vertical members and a horizontal member extending between the upper ends of the vertical members. Said nozzle bar may be movably mounted on said horizontal member so as to be movable between an upper out-of-use position and a lower in-use position. Said frame may be mounted or mountable on the worktable of an injection blow moulding machine so as to be pivotable about a vertical axis adjacent one of said vertical members to enable the apparatus of the present invention to be pivoted through 90° to enable access to the injection blow moulding machine, e.g., for tool setting, maintenance purposes and the like.

Figure 4:
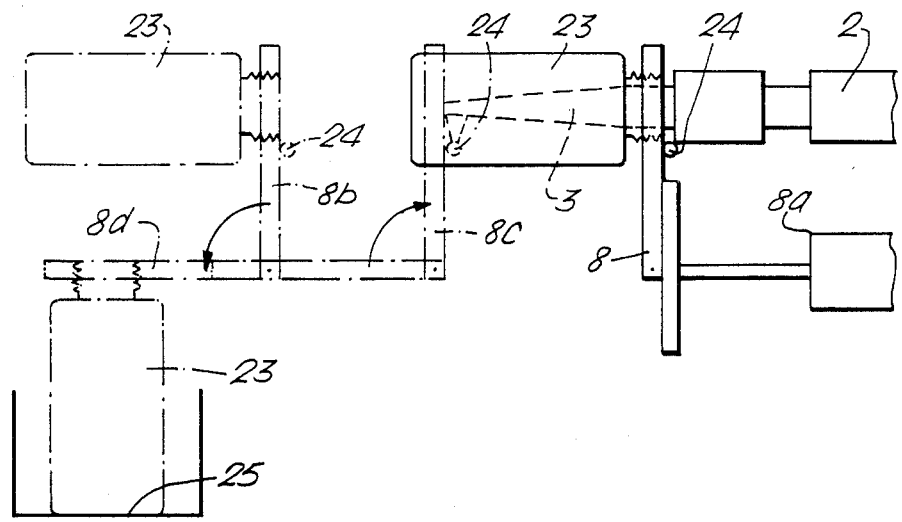

The present invention will be more particularly described with reference to the accompanying diagrammatic drawings, in which:

FIG. 1 is a plan view of an injection blow moulding machine of the horizontal rotary indexing kind provided with apparatus for cooling the core rods thereof according to the present invention, FIG. 2 is a front view of the apparatus of the present invention, FIGS. 3 and 4 are diagrams illustrating the stripping and cooling sequence of operations with known blow moulding machines, and FIGS. 5 and 6 are similar diagrams illustrating the stripping and cooling sequence of operations according to two embodiments of the present invention.

Referring to FIG. 1 of the drawings it will be seen that the injection blow moulding machine 1 comprises a rotary indexing head 2 on which is mounted a plurality of core rods 3, a stripping station 4, an injection mould station 5 and a blow mould station 6, the core rods being shown at the stripping station 4. Provided at the stripping station 4 is a stripper means 7 comprising a stripper bar 8 which is movable by a hydraulic ram 8a (FIGS. 3 to 6) between the advanced position shown in FIG. 1 and a retracted position in which it will engage blow moulded articles on the core rods 3 when the head 2 is moved to a lowered position. The stripper bar 8 is rotatable through 90° by a rotating mechanism comprising a rotary hydraulic actuator 9 when in the advanced position shown in order to deposit articles removed from the core rods 3 onto a suitable conveyor or other horizontal surface. This injection blow moulding machine is conventional and need not be described further.

Referring now also to FIG. 2, the apparatus of the present invention comprises a frame 10 which is mountable on the worktable 11 of the blow moulding machine 1 and which comprises a pair of spaced vertical members 12 and a horizontal member 13 extending between the upper ends of the vertical members 12. The frame 10 is pivotably mounted on the worktable 11 by a pivot pin 14 provided on one of a pair of feet 15 one of which is connected to the lower end of each of the vertical members 12. Mounted on the horizontal member 13 of the frame 10 is a hydraulic or pneumatic ram 16 the piston rod 17 of which carries a hollow nozzle bar 18 so that the nozzle bar 18 is movable between an upper out-of-use position and a lower in-use position shown in FIG. 2. Guide rods 19 on the nozzle bar 18 are slidable in apertures 20 in the horizontal member 13 to maintain the nozzle bar 18 parallel with the horizontal member 13 when it is moved between its in-use and out-of-use positions. The nozzle bar 18 comprises a plurality of nozzles 21 which correspond in number and spacing to the number and spacing of the core rods 3. The nozzles 21 may be provided by apertures in the nozzle bar 18 or by nozzles mounted in such apertures.

When the stripper means 7 is in advanced position and the nozzle bar 18 is in its in-use position as shown in the drawings each of the nozzles 21 will be aligned with a core rod 3 so as to direct cooling fluid onto the tip of the core rod axially of the core rod.

The interior of the nozzle bar 18 is connected or connectable to a source of cooling fluid under pressure by means of a suitable hose 22.

When it is desired to obtain access to the injection blow moulding machine, e.g., for the purpose of tool setting or maintenance, then the apparatus of the present invention can be pivoted through 90° about the pivot pin 14 to a position where it will not obstruct access to the machine.

The operation of the stripping and core rod cooling mechanisms of both conventional blow moulding machines and blow moulding machines according to the present invention will now be described with reference to FIGS. 3 to 6 of the drawings in which like parts have been given the like reference numerals as in FIGS. 1 and 2.

Referring now to FIG. 3 of the drawings it will be seen that in conventional blow moulding machines the sequence of operations for stripping blow moulded articles from the core rods 3 and cooling the core rods 3 is:

(1) with the stripper bar 8 in retracted position the rotary head 2 is lowered to engage the blow moulded articles 23 on the core rods with the stripper bar 8;

(2) the stripper bar 8 is moved to its fully advanced position 8b to remove the blow moulded articles 23 from the core rods 3;

(3) the stripper bar 8 is then moved to an intermediate core rod cooling position 8c;

(4) cooling fluid is supplied to nozzles 24 carried by the stripper means to cool the core rods 3;

(5) after cooling is completed the stripper bar 8 is returned to its retracted position, the rotary head 2 is then raised and a next blow moulding cycle can commence.

If such a conventional blow moulding machine is of the kind wherein the stripper bar 8 is rotatable through 90° to deposit the stripped blow moulded articles 23 on a conveyor 25 as shown in FIG. 4 then the sequence of operations becomes as follows:

(1) with the stripper bar 8 in retracted position and the stripper bar upright the rotary head 2 is lowered to engage the blow moulded articles 23 on the core rods 3 with the stripper bar 8;

(2) the stripper bar 8 is moved to its advanced position 8b to remove the moulded articles 23 from the core rods 3;

(3) the stripper bar 8 is rotated through 90° as shown at 8d to deposit the stripped articles 23 on the conveyor 25;

(4) the stripper bar 8, whilst still lowered, is moved to the intermediate position 8c to disengage the stripper bar 8 from the articles 23 deposited on the conveyor 25;

(5) the stripper bar 8 is rotated through 90° to its upright position to bring the cooling nozzles 24 carried thereby into core rod cooling position;

(6) cooling fluid is supplied to the cooling nozzles 24 to cool the core rods 3;

(7) on completion of cooling the stripper bar 8 is returned to its retracted position, the rotary head 2 is then raised and a next blow moulding cycle can commence.

It will be seen that with such conventional blow moulding machines cooling of the core rods 3 does not commence until the stripper bar 8 has been returned from its advanced position 8b to the intermediate position 8c, with the added delay in the machine of FIG. 4 of rotating the stripper bar 8 to its lowered position and then returning it to its upright position, that due to the positioning of the nozzles 24 on the stripper bar 8 cooling fluid is directed onto one side of the tip of each core rod 3, and that on completion of cooling of the core rods the stripper bar 8 has to be returned to its retracted position before a next blow moulding cycle can commence.

Referring now to FIG. 5 of the drawings it will be seen that according to one embodiment of the present invention the operation of the stripping and cooling means is:

(1) with the stripper bar 8 in retracted position the rotary head 2 is lowered to engage the blow moulded articles 23 on the core rods 3 with the stripper bar 8;

(2) the stripper bar 8 is moved to its fully advanced position 8b to remove the articles 23 from the core rods 3;

(3) the stripper bar 8 is rotated through 90° to its lowered position 8d to deposit the articles 23 on the conveyor 25;

(4) simultaneously with step (3) the nozzle bar 18 is lowered to the position shown at 18a and cooling fluid is supplied to the nozzles 21 so that cooling of the core rods 3 commences;

(5) whilst cooling of the core rods 3 continues the stripper bar 8 is withdrawn in its lowered condition to the intermediate position to disengage the stripper bar 8 from the articles 23 and is then rotated through 90° to its upright intermediate position 8c;

(6) on completion of cooling of the core rods 3 the nozzle bar 18 is returned to its raised position and the stripper bar 8 is then returned to its retracted position and finally the rotary head 2 is raised so that a next blow moulding cycle can commence.

It will be understood that if the blow moulding machine of the present invention is of the kind which does not include a conveyor 25 so that rotation of the stripper bar 8 is not required then the steps of rotating the stripper bar 8 as described in steps (3) and (5) of the FIG. 5 embodiment will be omitted.

The embodiment of FIG. 6 is similar to the embodiment of FIG. 5 except for steps (5) and (6) which are as follows:

(5) whilst cooling of the core rods 3 continues the stripper bar 8, in its lowered condition, is withdrawn to its fully retracted but lowered position 8e to disengage it from the articles 23 and to await the completion of cooling of the core rods 3;

(6) on completion of cooling of the core rods 3 the rotary head 2 is raised as shown at 2a and simultaneously therewith the stripper bar 8 is rotated through 90° to its upright position and the nozzle bar 18 is returned to its raised position, whereby a next blow moulding cycle can commence.

It will readily be appreciated that with the method and apparatus of the present invention either the cooling of the core rods 3 can be maximised within a given machine cycle or the total time required for stripping of articles 23 from the core rods 3 and cooling the core rods 3 can be reduced to reduce total cycle time and so increase productivity. It will also be understood that because the nozzles 21 are not mounted on the stripper bar 8 they can, when in cooling position, be adapted to direct cooling fluid axially onto the tips of the core rods 3 for faster and more even cooling of the tips of the core rods 3.

I claim:

1. Apparatus for cooling the core rods of an injection blow moulding machine having a stripping station at which blow moulded articles are removed from the core rods by stripper means movable between a retracted position in which blow moulded articles on the core rods can be engaged by the stripper means and an advanced position in which the blow moulded articles are removed from the core rods, the apparatus comprising nozzle means for directing cooling fluid onto the tips of the core rods, means for moving said nozzle means relative to the core rods and independently of the stripper means between an out-of-use position in which the nozzle means is out of the path of movement of the stripper means and an in-use position in which the nozzle means is interposed between the core rods and the stripper means and is adapted to direct cooling fluid onto the core rods, and means for supplying cooling fluid to said nozzle means when the nozzle means is in in-use position.

2. Apparatus according to claim 1, wherein said nozzle means comprises a plurality of nozzles which correspond in number to the number of core rods to be cooled and each of which, when the nozzle means is in in-use position, will be aligned with a core rod so as to direct cooling fluid onto the tip of the core rod substantially axially of the core rod.

3. Apparatus according to claim 1, wherein the nozzle means comprises a hollow nozzle bar the interior of which is connectable to a source of cooling fluid under pressure and which has spaced apertures along the length thereof which comprise said nozzles.

4. Apparatus according to claim 3, wherein a nozzle is mounted in each of said apertures.

5. Apparatus according to claim 3, comprising a frame which is mountable on the worktable of an injection blow moulding machine at the stripping station so as to straddle the stripper means, said frame comprising a pair of spaced vertical members and a horizontal member extending between the upper ends of the vertical members, said nozzle bar being mounted on said frame so as to be movable between an upper out-of-use position and a lower in-use position.

6. Apparatus according to claim 5, wherein said nozzle bar is carried on the piston rod of an actuating ram mounted on said horizontal member and wherein guide rods on said nozzle bar are slidable in apertures in said horizontal member.

7. Apparatus according to claim 5, wherein said frame is mountable on the worktable of an injection blow moulding machine so as to be pivotable about a vertical axis adjacent one of said vertical members.

8. An injection blow moulding machine of the horizontal rotary indexing kind having a rotary head which carries a plurality of core rods and which can be indexed to transport the core rods to successive work stations including an injection mould station where a measured quantity of plastics material is injected around each core rod to produce a pre-form, a blow moulding station where the pre-forms are blow moulded to form articles and a stripping station having stripping means for stripping the blow moulded articles and removing them from the core rods, comprising means for cooling the core rods after a stripping operation, the cooling means comprising nozzle means for directing cooling fluid onto the tips of the core rods, means for moving said nozzle means independently of said stripping means between an out-of-use position in which the nozzle means is out of the path of movement of the stripper means and an in-use position in which the nozzle means is interposed between the core rods and the stripper means and in which the nozzle means is adapted to direct cooling fluid onto the core rods, and means for supplying cooling fluid to said nozzle means when the nozzle means is in in-use position.

9. An injection blow moulding machine according to claim 8, wherein said nozzle means comprises a hollow nozzle bar the interior of which is connected to a source of cooling fluid under pressure and which has a plurality of nozzle apertures therein corresponding in number and spacing to the number and spacing of the core rods so that when the nozzle bar is in in-use position each of said nozzle apertures will be aligned with a said core rod for directing cooling fluid onto the tip of the core rod substantially axially of the core rod.

10. An injection blow moulding machine according to claim 9, comprising stripper means at said stripping station, said stripper means being movable between a retracted position in which it can engage moulded articles on said core rods and an advanced position in which said articles are removed from said core rods, said cooling means comprising a frame mounted on the worktable of the machine at the stripping station so as to straddle the stripper means, said frame comprising a pair of spaced vertical members and a horizontal member extending between the upper ends of said vertical members, said nozzle bar being mounted on said frame so as to be movable between an upper out-of-use position and a lower in-use position.

11. An injection blow moulding machine according to claim 10, wherein said stripper means comprises a stripper bar and means for rotating said stripper bar through 90° from an upright position to a lowered position when in its advanced position to deposit articles stripped from said core rods onto a horizontal surface, said stripper bar being retractable whilst in its lowered position to disengage it from the deposited articles.

12. An injection blow moulding machine according to claim 11, wherein said stripper bar is retractable whilst in its lowered position to an intermediate position and is returnable to its upright position whilst in said intermediate position.

13. An injection blow moulding machine according to claim 11, wherein said rotary indexing head is movable between a raised position and a lowered position to engage articles on said core rods to be stripped with said stripper bar and wherein said stripper bar is retractable to its retracted position whilst in its lowered position and is returnable to its upright position when said rotary indexing head is raised.

14. A method of cooling the core rods of an injection blow moulding machine having a stripping station at which blow moulded articles are removed from the core rods by stripper means movable between a retracted position in which blow moulded articles on the core rods can be engaged by the stripping means and an advanced position in which the blow moulded articles are removed from the core rods, the method comprising the steps of engaging the blow moulded articles with said stripper means, removing the blow moulded articles from the core rods by moving the stripper means to said advanced position, interposing nozzle means between the core rods and the stripper means, directing a cooling fluid onto the tips of the core rods using said nozzle means, and moving the nozzle means to an out-of-use position on completion of cooling of the core rods.

15. A method according to claim 14, wherein said stripper means comprises a stripper bar which is rotatable through 90° between an upright position and a lowered position, the method comprising rotating the stripper bar to its lowered position after it has been moved to said advanced position so as to deposit the articles stripped from the core rods onto a horizontal surface and retracting the stripper bar whilst in its lowered position to disengage it from the deposited articles, said nozzle means being interposed between the stripper bar and the core rods and cooling of the core rods being commenced whilst the stripper bar is being rotated to its lowered position.

16. A method according to claim 15, which comprises retracting said stripper bar whilst in its lowered position to an intermediate position, returning the stripper bar to its upright position at said intermediate position, maintaining the stripper bar at said intermediate position until cooling of the core rods has been completed and the nozzle means moved to its out-of-use position and then returning the stripper bar to its retracted position.

17. A method according to claim 15, which comprises retracting said stripper bar whilst in its lowered position to its retracted position, and on completion of cooling of the core rods simultaneously moving the nozzle means to its out-of-use position and rotating the stripper bar to its upright position.

* * * * *